United States Patent [19]

Wilhelmus van Steijn

[11] Patent Number: 4,976,482
[45] Date of Patent: Dec. 11, 1990

[54] APPARATUS FOR CLAMPING PIPE OR TUBE

[75] Inventor: Theodorus G. Wilhelmus van Steijn, Linschoten, Netherlands

[73] Assignee: P. Boer & Zn. B.V., Netherlands

[21] Appl. No.: 334,306

[22] Filed: Apr. 6, 1989

[30] Foreign Application Priority Data

Apr. 7, 1989 [NL] Netherlands ............... 8800890

[51] Int. Cl.$^5$ ............................................. B66C 1/44
[52] U.S. Cl. .................................. 294/102.1; 294/86.3
[58] Field of Search .................. 294/90, 94, 96, 102.1, 294/102.2, 119.2, 86.3, 86.31; 188/67

[56] References Cited

U.S. PATENT DOCUMENTS

| | | | |
|---|---|---|---|
| 1,436,246 | 11/1922 | Greve | 294/102.2 X |
| 2,570,039 | 10/1951 | Stone | 188/67 |
| 2,785,454 | 3/1957 | Young | 188/67 |
| 3,675,278 | 7/1972 | Powell | 294/102.2 |
| 4,275,488 | 6/1981 | Gray et al. | 24/263 DC |
| 4,773,689 | 9/1988 | Wolters | 294/96 X |
| 4,792,172 | 12/1988 | Motanari et al. | 294/102.2 |

Primary Examiner—Margaret A. Focarino
Assistant Examiner—Dean J. Kramer
Attorney, Agent, or Firm—Limbach, Limbach & Sutton

[57] ABSTRACT

An apparatus including wedges with buttons and cooperating guide blocks positioned about halfway along the length of the wedges between the buttons, each block including a projection on one side of the wedge and a recess on the other side, for clamping heavy pipes or tubes with a low number of driving assemblies. The blocks are mounted in a very simple manner.

6 Claims, 1 Drawing Sheet

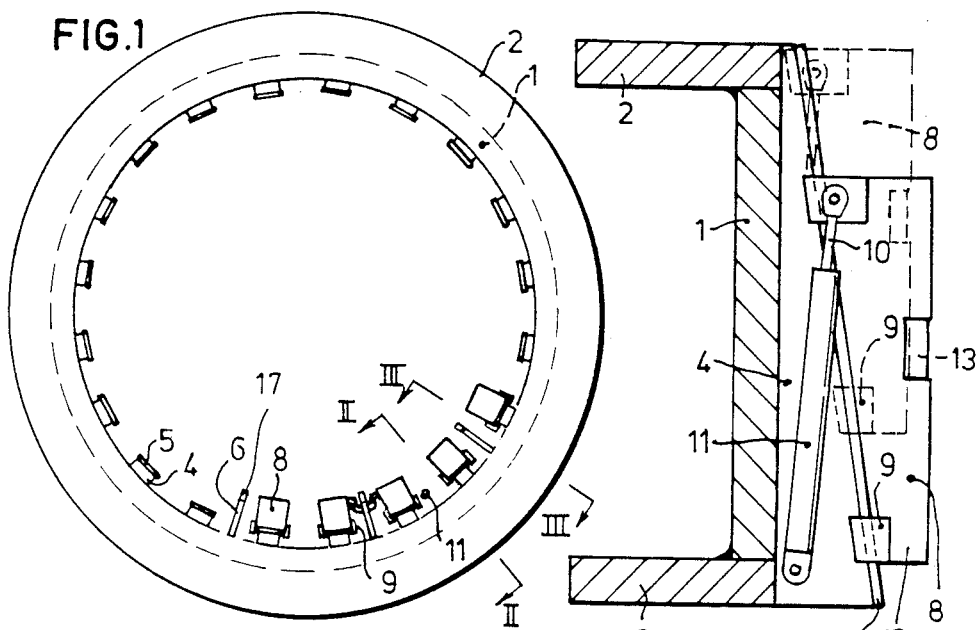
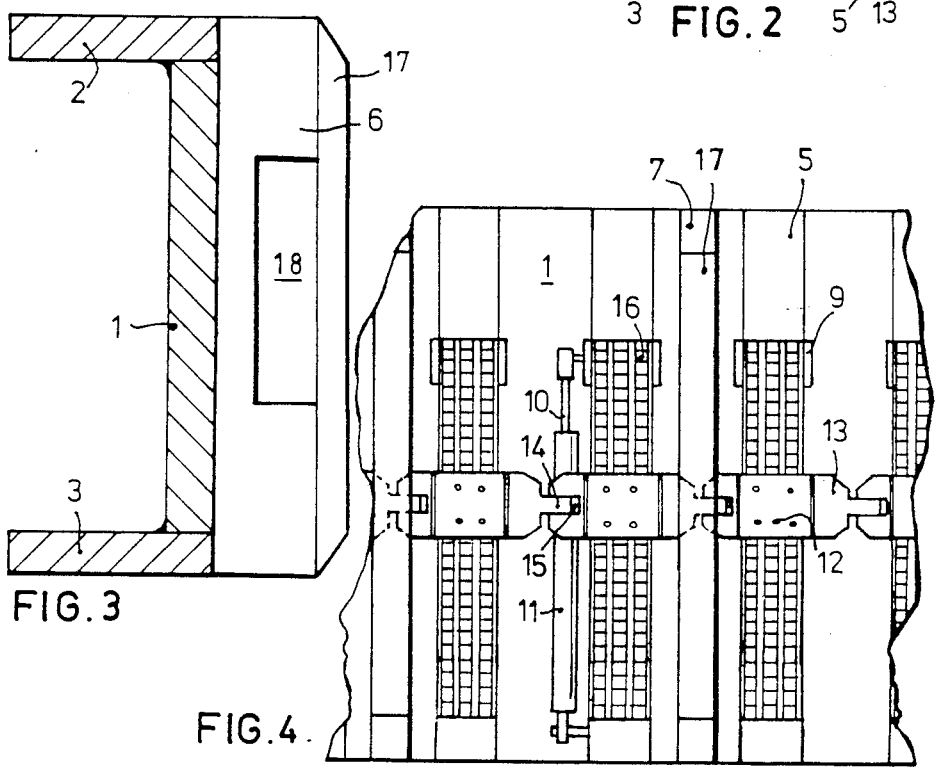

APPARATUS FOR CLAMPING PIPE OR TUBE

The invention relates to an apparatus for clamping a pipe or tube, comprising a cylindrical sleeve onto which at the interior surface at regular angular distances a number of counter wedges with guide tracks have been arranged, over which guide tracks wedges comprising inwardly directed buttons can travel in the axial direction of the sleeve. The wedges can be driven by at least one means in order to move their buttons in a radial direction up to the interior surface of the sleeve, while engaging means have been arranged to have the wedges move synchronously.

An external pipe clamp for lifting relatively light drilling pipes with an outer diameter of up to 30" is known from U.S. Pat. No. A-4,275,488. With this known apparatus, the engaging means have to be united before mounting them on the apparatus. This feature is inconvenient if this type of apparatus is used to lift and hold tubes with a diameter of e.g. 72" or even 84", firmly in place during welding. Known equipment for handling such heavy tubes have the joint disadvantage that under the influence of different actions of the driving means, the wedges will not always reciprocate synchronously. On account of that, this type of conventional apparatus has to be designed with greater dimensions than is strictly necessary. Apart from that, with the known apparatus the driving means of the wedges are easily damaged.

The invention aims to improve the above-mentioned situation. According to the invention, this has been attained in that the engaging means consist of guide blocks arranged in the plane of operation of the wedges, said guide blocks having a projection at the one side of the wedge and a recess on the other side, the projections being adapted to reciprocate within the recesses as the wedges are moved in a radial direction in relation to the interior surface of the sleeve.

The guide blocks are preferably arranged in a recessed portion about halfway along the length of the wedges between the buttons.

Only a small number of driving means is required. In theory, even one driving means would suffice. Since the driving means have been arranged between two adjacent wedges, the additional advantage of a compact apparatus is obtained. In those places where no driving means have been applied, spacer pieces can be provided. In that case the projections and recesses of the guide blocks have been offset in the direction of the cylindrical sleeve so as to reciprocate in bays (8) of the spacer pieces (6).

The invention will be further elucidated hereafter on the basis of the drawings, in which as an example an embodiment of an external clamping apparatus according to the invention is represented. In the drawings:

FIG. 1 shows a top view of the apparatus,

FIG. 2 shows, at a larger scale, a cross-section along the line II—II of FIG. 1 with the wedges in two extreme positions, FIG. 3 shows, at a larger scale, a cross-section along the line III—III of FIG. 1, and FIG. 4 shows a downcast view of the interior surface of the apparatus of FIG. 1.

The clamping apparatus shown in FIGS. 1-4 comprises a cylindrical sleeve 1 which at its top and bottom is provided with external reinforcing flanges 2 and 3.

On the interior surface of the sleeve 1 a set of twenty counter wedges 4 with guide tracks 5 has been arranged at regular mutual angular distances. A set of ten spacer means 6 has also been arranged at regular mutual angular distances, always between two counter wedges 4 and these spacer means extend over the entire height of the sleeve 1. The radially inwardly directed sides of the spacer means 6 are provided with slabs 17 for covering a bay 18 in which the guide blocks, which have been deleted from FIG. 3 but are to be described hereafter, move. The slabs 17 are provided both at the top and at the bottom with a bevel 7 for guiding a pipe or tube (not shown).

The guide tracks 5 of the counter wedges 4 cooperate with wedges 8, only five of which have been shown in FIG. 1. Supposing that the shown apparatus has been designed for handling tubes with a diameter of 84", then it can be adapted for handling tubes of 72" diameter by positioning filler pieces (not shown) between the sleeve 1 and the counter wedges 4. It appears from FIG. 2, that the wedges 8 comprise two guiding arms 9 that engage around the guide track 5. The top guide arm 9 of a number, e.g. two or four, of the wedges 8, is rotatably connected to the end of a piston rod 10 of a cylinder 11 that is rotably connected itself to a counter wedge 4.

About halfway along the length of the wedges 8 in a recessed portion between the buttons 16 a guide block 13 is fastened with the aid of a set of four bolts 12, said guide block having on the one side of the wedge 8 a projection 14 and on the other side a recess 15. Said projections 14 and recesses 15 obviously have to be able to pass the bays 18 of the spacer means 6. For reasons of standardization, it is of course efficient to construct all the guide blocks 13 with S-shaped ends in top view.

When the piston rod 10 is moved from the high position indicated by broken lines to the low position indicated by full lines, all the wedges 8 end up on a smaller diameter as the guide blocks 13 take on the non-driven wedges 8. Moreover the possible disharmonious action of the cylinders 11 is thus compensated for.

The wedges 8 have been provided in the usual manner with buttons 16 for a tight clamp into the exterior surface of the tube or pipe. At first sight, it would seem a major disadvantage with respect to the known apparatus that the button series are interrupted. However, this is only partly so, as for calculating the maximum admissable load of the tube or pipe its length is obviously most relevant, although the addition dependence on the diameter and wall thickness past the ends is also taken into account. This may also be done at the location of the guide blocks 13.

The scope of the claims also cover other embodiments than the one shown in the drawings.

I claim:

1. Apparatus for clamping a pipe or tube, comprising a cylindrical sleeve (1) onto which at the interior surface at regular angular distances a number of counter wedges (4) with guide tracks (5) have been arranged, wedges (8) comprising inwardly directed buttons (16), wherein the wedges are free to travel over the guide tracks in the axial direction of the sleeve, a means (11) connected to at least one of the wedges for driving said at least one of the wedges in order to move the buttons of said at least one of the wedges in an inward radial direction perpendicular to the axial direction of the sleeve, and engaging means arranged to move synchronously with the wedges, wherein the engaging means consists of guide blocks (13) arranged in a plane substantially perpendicular to the axial direction of the sleeve, each of said guide blocks having a projection (14) on one side of the wedge and a recess (15) on the other side, wherein the guide blocks are connected together in a continuous loop with the projection of each of the guide blocks reciprocably attached in the recess of the guide block adjacent thereto, so that each of the projections is free to reciprocate within the recess in which it is attached as the wedges (8) are moved in the radial direction in relation to the interior surface of the sleeve (1).

2. Apparatus according to claim 1, wherein each of the wedges has a central recessed portion for receiving one of the guide blocks, and wherein the central recessed portion is located between a first set of the buttons (16) and a second set of the buttons (16).

3. Apparatus according to claim 1 or 2, characterized in that the number of driving means (11) is considerably lower than that of the wedges (8) and counter wedges (4).

4. The apparatus of claim 1, also including spacer pieces (6) in places where no driving means have been applied.

5. Apparatus according to claim 4, characterized in that the projections (14) and recesses (15) of the guide blocks (13) have been offset in the axial direction of the cylindrical sleeve (1) so as to reciprocate in bays (18) of the spacer pieces (6).

6. The apparatus of claim 1, wherein the driving means includes fluid-operated cylinders (11).

* * * * *